United States Patent [19]

Mammino et al.

[11] Patent Number: 5,552,005
[45] Date of Patent: Sep. 3, 1996

[54] METHOD OF CONSTRUCTING A SEAMED FLEXIBLE IMAGING SHEET

[75] Inventors: Joseph Mammino, Penfield; Satchidanand Mishra, Webster; Shyshung S. Hwang, Penfield; Edward A. Domm, Hilton, all of N.Y.

[73] Assignee: Xerox Corporation, Stamford, Conn.

[21] Appl. No.: 815,086

[22] Filed: Dec. 27, 1991

[51] Int. Cl.⁶ .................................................. B29C 65/00
[52] U.S. Cl. ..................... 156/157; 156/73.4; 156/304.2; 156/304.6
[58] Field of Search ................................ 156/73.1, 73.4, 156/157, 153, 154, 304.2, 304.6

[56] References Cited

U.S. PATENT DOCUMENTS

| | | | |
|---|---|---|---|
| 3,459,610 | 8/1969 | Dijkers et al. | 156/73 |
| 3,488,240 | 2/1970 | Roberts | 156/73 |
| 3,493,448 | 2/1970 | Powell et al. | |
| 3,508,989 | 4/1970 | Lawrence et al. | 156/154 |
| 3,717,539 | 2/1973 | Roberts | 156/498 |
| 3,874,968 | 4/1975 | Robinson | 156/154 |
| 3,939,033 | 2/1976 | Grgach et al. | 156/515 |
| 4,197,149 | 4/1980 | Freitag et al. | 156/154 |
| 4,410,575 | 10/1983 | Obayashi et al. | |
| 4,430,146 | 2/1984 | Johnson | |
| 4,532,166 | 7/1985 | Thomsen et al. | |
| 4,568,588 | 2/1986 | Fujiki et al. | 428/57 |
| 4,648,931 | 3/1987 | Johnston | |
| 4,758,486 | 7/1988 | Yamazaki et al. | |
| 4,838,964 | 6/1989 | Thomsen et al. | |
| 4,878,985 | 11/1989 | Thomsen et al. | |
| 4,883,742 | 11/1989 | Wallbillich et al. | |
| 4,937,117 | 6/1990 | Yu | |
| 4,959,109 | 9/1990 | Swain et al. | |
| 4,968,369 | 11/1990 | Darcy et al. | |
| 5,021,109 | 6/1991 | Petropoulos et al. | |
| 5,085,719 | 2/1992 | Eck | 156/73.4 |

Primary Examiner—Jeff H. Aftergut
Assistant Examiner—Richard Crispino
Attorney, Agent, or Firm—Peter H. Kondo; Gary G. Heffernan; Zosan S. Soong

[57] ABSTRACT

A flexible imaging sheet and a method of constructing a flexible imaging sheet is disclosed. The method of constructing a flexible imaging sheet comprises a step of overlapping, a step of joining, and a step of shaping. In the step of overlapping, a first marginal end region and a second marginal end region of a sheet are overlapped to form an overlap region and a non-overlap region. In the step of joining, the first marginal end region and the second marginal end region of the sheet are joined to one another by a seam in the overlap region. In the step of shaping, the overlap region is shaped to form a generally planar surface co-planar with a surface of the non-overlap region. The flexible imaging sheet comprises a first marginal end region and a second marginal end region The first marginal end region and the second marginal end region are secured by a seam to one another in the overlap region. The first marginal end region and the second marginal end region are substantially co-planar to minimize stress on the flexible imaging sheet. Minimization of stress concentration, resulting from dynamic bending of the flexible imaging sheet during cycling over a roller within an electrophotographic imaging apparatus, is particularly accomplished in the present invention.

1 Claim, 9 Drawing Sheets

METHOD OF CONSTRUCTING A SEAMED FLEXIBLE IMAGING SHEET

BACKGROUND OF THE INVENTION

1. Statement of Related Cases

The present application is related to the companion applications filed on the same date herewith and commonly assigned: U.S. patent application Ser. No. [D/90388] entitled "A Shaped-Altered Seamed Imaging Flexible Member and Method of Constructing a Flexible Imaging Sheet"; and U.S. patent application Ser. No. [D/91073] entitled "A Scribed Seamed Imaging Flexible Member and Method of Constructing a Flexible Imaging Sheet".

2. Field of the Invention

This invention relates generally to a flexible member, and more specifically, the present invention is directed to an improved seamed imaging flexible member having generally undetectable seam defects.

3. Description of the Prior Art

The basic xerographic process comprises exposing a charged imaging photoconductive member, typically a flexible member or a non-flexible drum, to a light image of an original document. The irradiated areas of the photoconductive surface are discharged to record thereon an electrostatic latent image corresponding to the original document. A development system, thereupon, moves a developer mix of carrier granules and toner particles into contact with the photoconductive surface. The toner particles are attracted electrostatically from the carrier granules to the latent image forming a toner powder image thereon. Thereafter, the toner powder image is transferred to a sheet of support material. The sheet of support material then advances to a fuser which permanently affixes the toner powder image thereto.

There exists a wide variety of flexible members which can be utilized within an electrophotographic machine that utilizes the basic xerographic process. Of these, the most prominent in importance is the electrophotographic imaging member. The methods for constructing a flexible sheet and problems encountered therewith that are described hereafter pertain in particular to an imaging member, more specifically, a photoconductive member. However, a wide variety of flexible members exist, for example, intermediate transfer members, ionographic members, dielectric members and other members which include a wide variety of coating or special application layers. The following discussion pertaining to an imaging member applies equally to the above-described members as with respect to the problems encountered in the constructing and utilization thereof.

An electrophotographic imaging flexible member may be provided in a number of forms. For example, the imaging member may be a homogeneous layer of a single material such as vitreous selenium, or it may be a composite layer containing a photoconductor substrate layer such as polyethylene terephthalate and one or more coating layers such as an anti-curl back coating layer. In the complex, highly sophisticated duplicating and printing systems, modern photoconductive imaging members (which must be highly flexible, adhere well to adjacent layers, and exhibit predictable electrical characteristics within narrow operating limits) include a wide variety of different functioning layers. For example, one type of multilayered photoreceptor that has been employed as a belt in electrophotographic imaging systems comprises a substrate, a conductive layer, a blocking layer, an adhesive layer, a charge generating layer, a charge transport layer, a conductive ground strip layer (adjacent to one edge of the imaging layers), an anti-curl back coating layer and an optional over-coating layer.

The electrophotographic imaging flexible member may be fabricated from a sheet cut from a web. The sheets are generally rectangular in shape, and all sides may be of the same length or one pair of parallel sides may be longer than the other pair of parallel sides. The sheets are formed into a belt by joining overlapping opposite marginal end regions of the sheet. A seam is typically produced in the overlapping marginal end regions at the point of joining. Joining may be effected by any suitable means. Typical joining techniques include welding (including ultrasonic), gluing, taping, pressure heat fusing and the like. Ultrasonic welding is generally the preferred method of joining because of its speed, cleanliness (no solvents) and production of a thin and narrow seam. In addition, ultrasonic welding is preferred because it causes the generation of heat at the contiguous overlapping marginal end regions of the sheet to maximize melting of one or more layers therein.

When ultrasonically welded into a belt, seams in some multilayered imaging flexible members can delaminate during fabrication when larger webs are slit into smaller belt size sheets. Further, after the sheets are welded into belts, the belts tend to delaminate during extended cycling over small diameter support rollers or when subjected to lateral forces caused by rubbing contact with stationary web edge guides of a belt module during cycling. Seam delamination is further aggravated when the belt is employed in electrophotographic imaging systems utilizing blade cleaning devices. In addition, belt delamination is encountered during the web slitting operations fabricating belt photoreceptors from wide webs. Alteration of the materials in the various belt layers such as the conductive layer, hole blocking layer, adhesive layer, charge generating layer, and/or charge transport layer to reduce delamination is not easily accomplished. The alteration of the materials may adversely affect the overall electrical, mechanical and other properties of the belt such as residual voltage, background, dark decay, flexibility and the like.

For instance, the Imaging flexible member in an electrophotographic machine can be a photoreceptor belt fabricated by the lap-joined ultrasonic welding of the opposite marginal end regions thereof. In the ultrasonic seam welding process, ultrasonic energy transmitted to the overlap region (where the marginal end regions of the flexible member are joined) is used to melt the sheets of photoconductive, substrate, and/or coating materials into a seam. The ultrasonic welded seams of multilayered photoreceptor belts are relatively brittle and low in strength and toughness. The joining techniques, particularly the welding process, can result in the formation of molten material that projects beyond the sides and the edges of the seam in the overlap region of the photoreceptor belt. This, in turn, results in the overlap region having a substantially larger thickness than that of the remainder of the photoreceptor belt.

The photoreceptor belt in an electrophotographic imaging apparatus undergoes strain as the belt is cycled therethrough over a plurality of rollers therein. The excessive thickness of the photoreceptor belt in the seam region due to the presence of the molten material results in a large induced bending strain as the seam goes over each roller. Generally, small diameter support rollers, highly desirable for simple, reliable copy paper stripping systems, are used in the electrophotographic imaging apparatuses having a photoreceptor belt system operating in a very confined space. Unfortunately, the small diameter rollers, e.g., less than about 0.75 inches (19 millimeters) in diameter, raise the threshold of the mechanical performance criteria to such a high level that the photoreceptor belt seam failure can become unacceptable for the multilayered belt photoreceptors.

Under dynamic fatiguing conditions, the seam provides a focal point for stress concentration and becomes the initial point of failure in the mechanical integrity of the belt. The excessive thickness of the seam region, thus, tends to shorten the life of the seam and, thereby, the life of the flexible member in copiers, duplicators, and printers. There is a need for improving flexible members to have a seam which can withstand greater fatiguing conditions.

The following disclosures may be relevant to various aspects of the present invention:

U.S. Pat. No. 3,493,448 Patentee: Powell et al. Issued: Feb. 3, 1970

U.S. Pat. No. 4,410,575 Patentee: Obayashi et al. Issued: Oct. 18, 1983

U.S. Pat. No. 4,430,146 Patentee: E. Johnson Issued: Feb. 7, 1984

U.S. Pat. No. 4,532,166 Patentee: Thomsen et al. Issued: Jul. 30, 1985

U.S. Pat. No. 4,648,931 Patentee: O. Johnston Issued: Mar. 10, 1987

U.S. Pat. No. 4,758,486 Patentee: Yamazaki et al. Issued: Jul. 19, 1988

U.S. Pat. No. 4,838,964 Patentee: Thomsen et al. Issued: Jun. 13, 1989

U.S. Pat. No. 4,878,985 Patentee: Thomsen et al. Issued: Nov. 7, 1989

U.S. Pat. No. 4,883,742 Patentee: Wallbillich et al. Issued: Nov. 28, 1989

U.S. Pat. No. 4,937,117 Patentee: Yu Issued: Jun. 26, 1990

U.S. Pat. No. 4,959,109 Patentee: Swain et al. Issued: Sep. 25, 1990

U.S. Pat. No. 4,968,369 Patentee: Darcy et al. Issued: Nov. 6, 1990

U.S. Pat. No. 5,021,109 Patentee: Petropoulous et al. Issued: Jun. 4, 1991

Co-pending U.S. patent application Ser. No. 07/634,365 Applicant: Swain et al. Filed: Dec. 27, 1990

The relevant portions of the foregoing disclosures may be briefly summarized as follows:

U.S. Pat. No. 4,758,486 discloses an endless belt photoconductor whose opposite ends are joined by an ultrasonic connecting method. An over-coating layer is formed over the joined ends. A resin layer is formed along the joined portion to provide reinforcement.

U.S. Pat. No. 4,648,931 discloses a method of forming a bead seal in a biaxially oriented polymer film by heat bonding. The method consists of pressing together web layers in a sealing zone, a selected segment of the pressed web being heated above the bonding temperature of the plastic while adjacent web segments are maintained below that temperature. The heated web segment has a relatively lower surface friction than the surfaces pressing the adjacent web segment. The layers of the heated segment of the web are physically unrestrained against shrinking during heating and are allowed to shrink back to their pre-oriented molecular configuration while the adjacent segment is restrained against movement. A hermetic bead seal is thus formed between the web layers.

U.S. Pat. No. 4,430,146 discloses a belt splicing method and apparatus. The apparatus comprises a pair of longitudinal bars on which are respectively mounted platen heating assemblies. One bar is centrally supported pivotally on a clamping arrangement and the other bar is removably connected with the clamping arrangement in a manner permitting pivotable disposition of the bars with their platens in opposed facing parallel relation at various spacings. The apparatus facilitates a new belt splicing method eliminating the conventional need to use supplementary liquid thermoplastic material to effect bonding of the belt ends. By this process, a new belt splice is provided with the spliced ends being fused together with their respective thermoplastic material.

U.S. Pat. No. 4,883,742 discloses a joining of an end and/or lateral areas of thermoplastically, processed, photosensitive layers. The end and/or lateral areas of photosensitive layers are overlapped to avoid bubbles and air cavities between the end and/or lateral areas. The overlapped area is then heated under pressure to firmly join the areas together. The joined photosensitive layer is then treated and smoothed to shape it to size.

U.S. Pat. No. 4,410,575 discloses a method of lap welding fabrics together by superposing two end portions of one or two fabrics on each other with an interposing bonding tape between the superposed two end portions. The method includes applying a high frequency wave treatment and/or heat treatment by pressing at least one of the superposed end portions to melt the interposed portion of the bonding tape in order to lap melt the fabrics to each other. At least one side edge portion of the tape extends outwardly over an edge of the end portion which is deformed from the forces absorbed when the heat treatment and frequency wave treatment are applied. The fabrics may be made of any fibers or natural fibers.

U.S. Pat. No. 5,021,109 discloses a process for preparing a multilayered sheet to form a flexible belt. A tubular sleeve of polymeric material is heated to at least apparent glass transition temperature. The tubular sleeve is placed about a mandrel and treated with one or more layers. The sleeve is reheated, then removed from the mandrel. A seamless belt, having a predetermined inner circumference, is formed.

U.S. Pat. No. 3,493,448 discloses a method of splicing photographic film by an ultrasonic welding apparatus which includes steps comprising sandblasting the ends to be welded and chilling the fused ends to be fused together.

U.S. Pat. No. 4,968,369 and U.S. Pat. No. 4,878,985 each disclose an apparatus and process for fabricating belts wherein the leading edge and the trailing edge are overlapped to form a loop of a web segment loosely suspended from the joint formed thereby. The web is sheared to form a leading edge free of defects. An ultrasonic belt welding station comprising an ultrasonic horn and transducer assembly is utilized in the fabrication of the belt.

U.S. Pat. No. 4,838,964 discloses a process for fabricating belts wherein the leading edge and the trailing edge are overlapped to form a loop of a web segment loosely suspended from the joint formed thereby. The web is sheared to form a leading edge free of defects. An ultrasonic belt welding station comprising an ultrasonic horn and transducer assembly is utilized in the fabrication of the belt.

U.S. Pat. No. 4,937,117 discloses a flexible belt fabricated from a substantially rectangular sheet having a first edge joined to a second parallel edge to form a seam. Flashings at the ends of the welded seam of the belt are removed by means of a notching device capable of cutting the desired elongated shape.

U.S. Pat. No. 4,959,109 discloses a process and apparatus for fabricating a unitary belt comprising two rotatable mandrels and a wrapping station. A web is wrapped around each rotatable mandrel whereat the web is severed to form a trailing edge. A wrapping station overlaps a leading edge of the web to form a belt having a seam.

U.S. Pat. No. 4,532,166 discloses a welded web and a process for forming the web. The web may be formed by a process in which a web having a first edge is provided. At least one aperture is formed in at least the first edge. The first edge is then overlapped on an exposed surface of a second edge. Ultrasonic welding may be used to raise the temperature of at least the region of contiguous contact adjacent the aperture. Thermoplastic material from the second edge at least partially fills the aperture, thereby, bonding the first edge to the second edge.

Co-pending U.S. patent application Ser. No. 07/634,365 discloses a process for coating belt seams with hardenable coatings containing film forming polymers. A smooth liquid coating comprises a hardenable film forming polymer on the welded seam. The coating, substantially free of fugitive solvent, is hardened to form a smooth solid coating on the seam.

SUMMARY OF THE INVENTION

In accordance with one aspect of the present invention, there is provided a method of constructing a flexible imaging sheet comprising the steps of overlapping, joining, and shaping. In the step of overlapping, a first marginal end region and a second marginal end region of the flexible imaging sheet are overlapped to form an overlap region and a non-overlap region. In the step of joining, the first marginal end region and the second marginal end region of the sheet are joined to one another in the overlap region. In the step of shaping, the overlap region is shaped to form a generally planar surface substantially co-planar with a surface of the non-overlap region.

Pursuant to another aspect of the present invention, there is provided a flexible imaging sheet comprising a first marginal end region and a second marginal end region. The first marginal end region and the second marginal end region are secured to one another in the overlap region. The first marginal end region and the second marginal end region are substantially co-planar in the overlap region for minimizing stress concentration on the flexible imaging sheet.

Pursuant to another aspect of the present invention, there is provided a method of constructing a flexible imaging sheet, comprising the step of forming and the step of finishing. In the step of forming, a seam is formed in the flexible imaging sheet to join a first marginal end region of the flexible imaging sheet to a second marginal end region of the flexible imaging sheet. In the step of finishing, the seam is finished to substantially eliminate protrusions extending therefrom.

Other features of the present invention will become apparent as the description thereof proceeds and upon reference to the drawings.

BRIEF DESCRIPTION OF THE DRAWINGS

In the detailed description of the preferred embodiments of the present invention, reference is made to the accompanying drawings, in which.

In the drawings and the following description, it is to be understood that like numeric designations refer to components of like function.

DETAILED DESCRIPTION OF THE PREFERRED EMBODIMENTS

Although specific terms are used in the following description for the sake of clarity, these terms are intended to refer only to the particular structure of the invention selected for illustration in the drawings, and are not intended to define or limit the scope of the invention.

Figure 1:
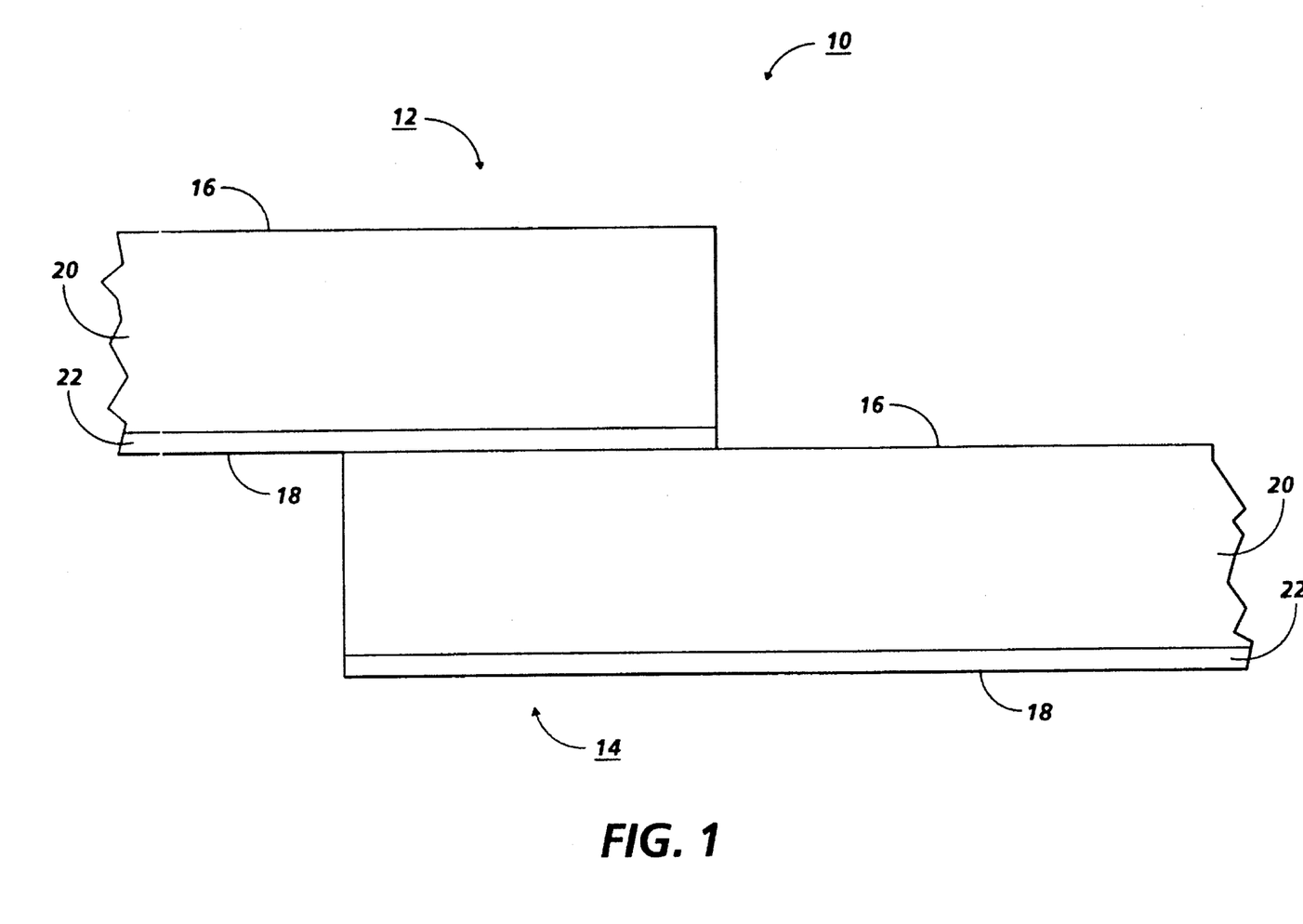
FIG. 1 is a cross-sectional view of a multiple layered flexible member.

Referring to FIG. 1, there is illustrated a flexible member 10 having a first marginal end region 12 overlapping a second marginal end region 14 to form an overlap region. The flexible member 10 has a first exterior surface or side, e.g., top surface 16, and a second exterior surface opposed therefrom, e.g., bottom surface 18. In the overlap region, the bottom surface 18 of the flexible member 10 within the first marginal end region 12 abuts the top surface 16 of the flexible member 10 within the second marginal end region 14.

The flexible member 10 can be utilized within an electrophotographic imaging apparatus and may be a single film substrate member or a member having a film substrate layer combined with one or more additional layers of imaging material, ionographic material, or dielectric material. Additionally, a wide variety of coating or special application material may be applied to the surface(s) of one or more of the layers of the flexible member 10. Thus, the flexible member may take the form of an imaging member, intermediate transfer member (a toner transfer member), ionographic member, dielectric member, or other members which include a wide variety of coating or special application layers. Because of the importance of imaging members and for ease of the discussion of the flexible members 10, the description which follows is described particularly with the concept in mind that the flexible member 10 will eventually form an imaging member. However, the application of the teachings of the present invention pertains to each of the wide variety of flexible members 10 which exist, and the scope of the description is intended to be broad enough to include all such flexible members.

The flexible member 10 can include a wide variety of layers. Common layers found in many modern flexible members include a charge transport layer, a binder generator layer, an adhesive layer, a blocking layer and a conductive ground layer. Since it is becoming common to use a multiple layered imaging member in the modern sophisticated machines, a multiple layered flexible member 10 is illustrated in FIG. 1. The layers of the flexible member 10 can comprise numerous suitable materials having the required mechanical properties. Examples of the types of layers and the properties thereof are described in U.S. Pat. Nos. 4,786,570, 4,937,117 and 5,021,309, the relevant portions of which are incorporated herein by reference thereto. The illustrative multiple layered flexible member 10 comprises a substrate layer of a suitable material, such as the illustrative biaxially oriented polyethylene terephthalate layer (a thermoplastic film forming polymeric layer), hereinafter referred to as PET 20, and a coating layer, such as the illustrative anti-curl back coating layer, hereinafter referred to as ACBC 22. Preferably, the thickness of the substrate layer ranges from 25 to 150 microns, and the thickness of the coating layer ranges from 1 to 100 microns.

The method of constructing a flexible sheet according to the present invention contemplates changing the shape profile of the flexible member to minimize stress thereon. Since the effort in changing the shape profile of the flexible member 10 tends to correlate to the thickness thereof and the amount of layers therein, limiting the thickness and/or number of layers may prove advantageous in facilitating the construction of the flexible member 10. However, the method of the present invention can be performed satisfactory on flexible members 10 having a wide range of thicknesses and multiple layers. If preferred, although of some degree of difficulty, one or two layers may be joined and additional layers may be coated onto the joined flexible member 10 thereafter. For example, the flexible member 10 may be a single film substrate sheet which is first joined and shaped into a belt or sleeve. Subsequent to joining and shaping, a film forming binder layer may be formed on the flexible member. Thus, the flexible member 10 could be subsequently coated with one of several layers comprising a photoconductive layer, an ionographic layer, dielectric layer or other coating layers.

In the illustrative example of the present application, the marginal end regions 12 and 14 of the dual layered flexible member 10 are joined to form a continuous member. Once joined into a continuous member, the flexible member 10 (although not illustrated or further described) can then be subsequently coated with one of the previously mentioned layers. The marginal end regions 12 and 14 can be joined by any suitable means including gluing, taping, stapling, pressure and heat fusing. Preferably, both heat and pressure are used to bond the marginal end regions 12 and 14 into a seam within the overlap region to form a continuous flexible member 10 such as a belt, sleeve or cylinder. Thereafter, the application of appropriate coatings to the continuous flexible member 10 can form, for example, a photoconductive belt.

One suitable heat and pressure joining means includes ultrasonic welding, in which, the flexible member 10 can form a continuous belt fabricated by lap-joined ultrasonic welding of one or more layers. In the ultrasonic seam welding process, ultrasonic energy, applied to the overlap region, is used to melt the applicable layer of the flexible member 10 until the marginal end regions 12 and 14 are joined.

Figure 2:
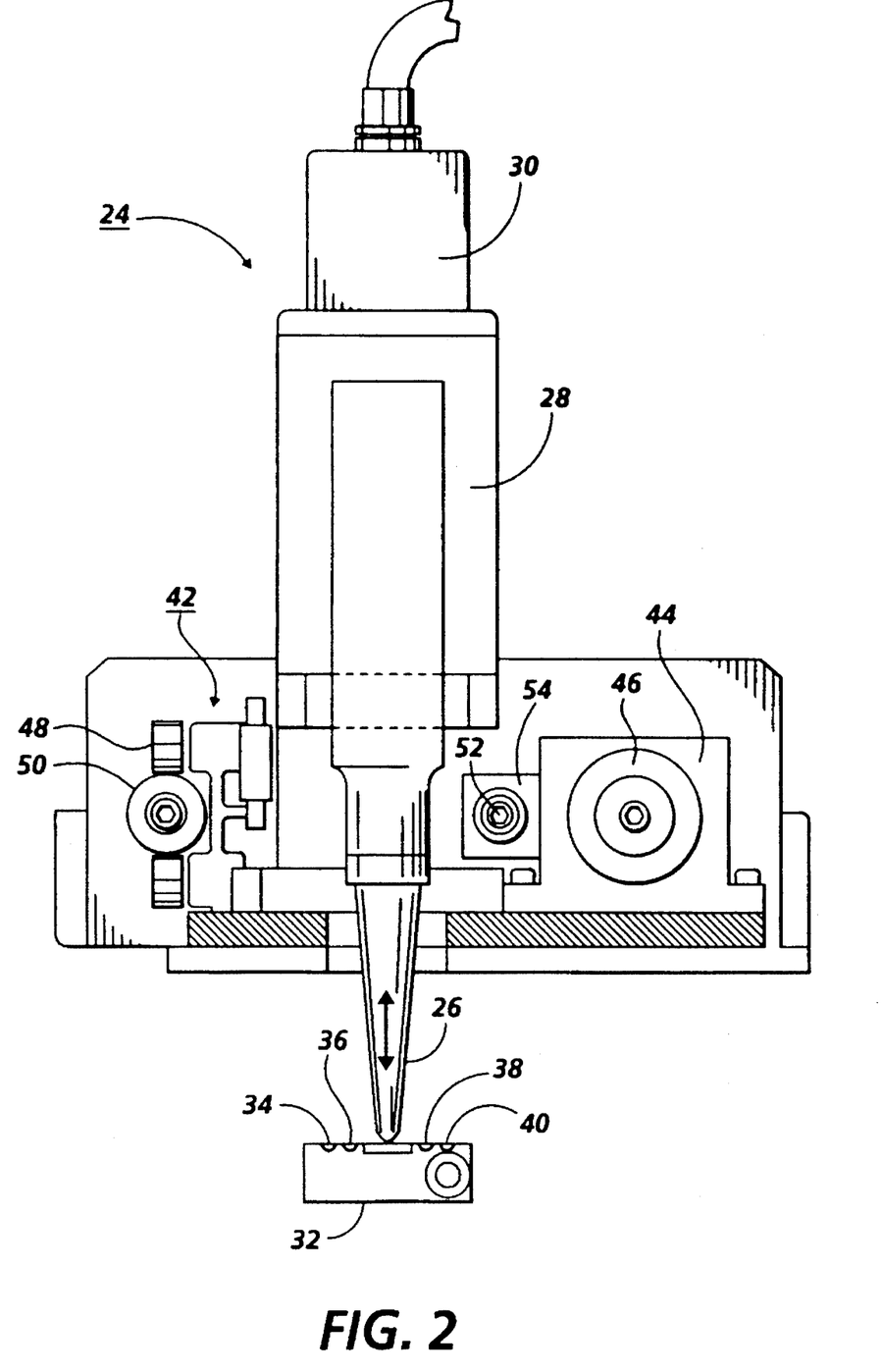
FIG. 2 is a schematic elevational view of an ultrasonic welding apparatus.

An ultrasonic welding apparatus 24 arranged in accordance with prior practice is shown in FIG. 2. The apparatus 24 comprises an ultrasonic horn 26 which is caused to oscillate along its longitudinal axis by a transducer assembly 28 affixed to the top thereof. A solenoid 30 is mounted above the transducer assembly 28 to extend or retract the ultrasonic horn 26 and the transducer assembly 28 in the vertical direction. The overlap region, (not shown in FIG. 2) formed by the overlapping segment marginal end regions 12 and 14 of the flexible member 10 in FIG. 1, is supported by the upper surface of an anvil 32 and held in place below the path of the ultrasonic horn 26 by suction from parallel rows of grooves 34, 36, 38 and 40. The anvil 32 preferably includes or is connected to a compressed air source for facilitating the adjustment of the suction pressure. The ultrasonic horn 26 and the transducer assembly 28 are supported by the lower end of a vertically reciprocating shaft (not shown) extending from the lower end of the solenoid 30 mounted to the upper hinged half of a substantially horizontally reciprocating carriage 42. One side of the lower hinged half of the carriage 42 is suspended from a pair of pillow blocks 44 which, in turn, slides on a horizontal bar 46. The other side of carriage 42 is suspended from a pair of cam followers 48 that rolls on the outer surface of a horizontal bar 50. A rotatable lead screw 52 drives the horizontally reciprocating carriage 42 through a ball screw 54 secured to the carriage 42. The horizontal bars 46 and 50, as well as the lead screw 52, are secured at each end by a frame assembly (not shown). The lead screw 52 is rotated by a belt driven by an electric motor (not shown) which is also supported by the frame assembly.

An alignment pin (not shown) is mounted to the frame assembly. The alignment pen is adapted to mate with an alignment pin receiving hole at the free end of the anvil 32 when the anvil 32 is indexed into the position for welding of the overlap region. An adjustable set screw (not shown) is positioned to extend upwardly from the lower hinged half of the carriage 42 to assist in maintaining a predetermined spacing between the bottom of the ultrasonic horn 26 and the top of the anvil 32. The adjustable screw is also utilized to ensure a uniform pressure on the overlap region. The end of the adjustable set screw rests against the bottom of the upper hinged half of the carriage 42. The upper and lower hinged halves of the carriage 42 are joined by a hinge (not shown). The hinge allows the upper hinged half of the carriage 42 and the ultrasonic horn 26 and the transducer assembly 28 to pivot along the hinge during welding to compensate in a substantially vertical direction for any irregularities encountered along the overlap region during welding. Preferably, an air bellows (not shown) is positioned between the upper hinged half and the lower hinged half of the carriage 42 to adjust the pressure of the bottom of the ultrasonic horn 26 against the overlap region, e.g., to function as a counterbalance.

When the overlapped marginal end regions 12 and 14 of the flexible member 10 are positioned on the anvil 32 below the ultrasonic horn 26 at a belt welding station, the solenoid 30 is inactivated to extend the transducer 28 toward the anvil 32 from a retracted position (in which the solenoid 30 is activated). The transducer 28 is activated by the electric motor to drive the lead screw 52 which, in turn, moves the horizontally reciprocating carriage 42 over the overlap region supported by the anvil 32. A second solenoid (not shown) is activated to drive the alignment pin into the alignment pen receiving hole located at the free end of the anvil 32.

Lowering of the transducer 28 by inactivation of the solenoid 30 brings the ultrasonic horn 26 into compressive engagement with an appropriate overlap region, i.e., 0.047 inches of the flexible member 10. The welding surface of the ultrasonic horn 26 may be of any suitable shape, such as flat or curved cross-sectional shapes. The high vibration frequency of the ultrasonic horn 26 along its vertical axis causes the temperature of the contiguous overlapping PET 20 and ACBC 22 of the flexible member 10 to increase until at least one layer, particularly the PET 20 and preferably both the PET 20 and the ACBC 22 of the flexible member 10, flows. The flow of at least one layer results in the formation of a continuous belt in which the marginal end regions 12 and 14 are joined in the overlap region to form a seam. Direct PET 20-PET 20 is required to achieve optimum seam strength.

In general, welding of the contiguous overlapping surfaces of a flexible member 10 is best accomplished when the flexible member comprises layers which flow as a result of the applied energy of ultrasonic oscillations. For optimal seam strength, and thereby optimal strength of the belt, it is preferable that the layers 20 and 22 at the overlap region be brought to melting by the applied ultrasonic energy. In this manner, direct PET 20/PET 20 fusing can be achieved to form a welded seam.

The overlap portion of the flexible member 10 that is induced to melt and weld the marginal end regions 12 and 14 together may be provided solely by the substrate layers (PET 20) of each marginal end region 12 and 14, or from both the substrate layer (PET 20) and a coating layer (ACBC 22) each from opposite marginal end regions 12 and 14. The flexible member 10 may be of any suitable thickness which will allow adequate heating of the contiguous overlapping surfaces of the marginal end regions 12 and 14 to permit sufficient heat energy to be applied at the contiguous overlapping surfaces to cause joining. Any suitable heating technique may be used to provide the heat necessary at the contiguous overlapping surfaces to melt the thermoplastic material and cause it to weld the flexible member 10 at the overlap region.

If desired, the horn 26 may comprise highly thermoconductive material such as aluminum to ensure the achievement of higher temperatures at the interface between the overlapping marginal end regions 12 and 14 of flexible member 10 and to minimize the thermal distortion of the exposed surfaces thereof. When ultrasonic welding is utilized, the rapid impact of one marginal end region 12 against the other marginal end region 14 of the flexible member 10 at the contiguous overlapping region, when positioned between the anvil 32 and the ultrasonic horn 26, causes the generation of heat. A horn vibration frequency from a range of about 16,000 KHz or higher may be utilized to cause the flexible member 10 to soften and melt. A typical horn suitable for joining the flexible member 10 utilizes a sonic generator of about 400–800 watt capacity, an operational frequency of about twenty KHz, and a flat input horn welding surface about twelve millimeters long and about 0.4 to 1.0 millimeters wide. A typical motion amplitude for this horn is about seventy-six micrometers. The combined weight of about two and a half kilograms for the ultrasonic horn 26, the transducer assembly 28 and the solenoid 30, and the upper hinged half of the carriage 42 are sufficient to bring the horn 26 into forced contact with the overlap region. However, an air bellows, a spring bias, weights, counterweights, or other suitable means may be utilized to increase or decrease the contact force. Since heat is generated very rapidly at the interface of the device, sufficient heat to cause the layers of PET 20 and ACBC 22 of the flexible member 10 to melt can occur typically in about 1.2 seconds as the horn 26 traverses along the overlap region. The ultrasonic welding apparatus typically can produce weld energy in the range of 20 to 80 Joules, a weld force in the range of 30 to 110 pounds, and a trigger force in the range of 20 to 60 pounds.

As the horn 26 is lowered to the overlap region of the flexible member 10, electrical power is supplied to the transducer 28 and the electric motor (not shown) is activated to drive the lead screw 52 which, in turn, moves the horizontally reciprocating carriage 42 and the ultrasonic horn 26 along the overlap region of the flexible member 10. After the carriage 42 completes its traversal of the overlap region, the solenoid 30 is activated to retract the transducer 28 away from anvil 32, the transducer 28 is inactivated, the second solenoid (not shown) is inactivated to remove the alignment pin (not shown) from the alignment pin receiving hole, and the electric motor (not shown) is reversed to return the horizontally reciprocating carriage 42 to its starting position.

Figure 3:
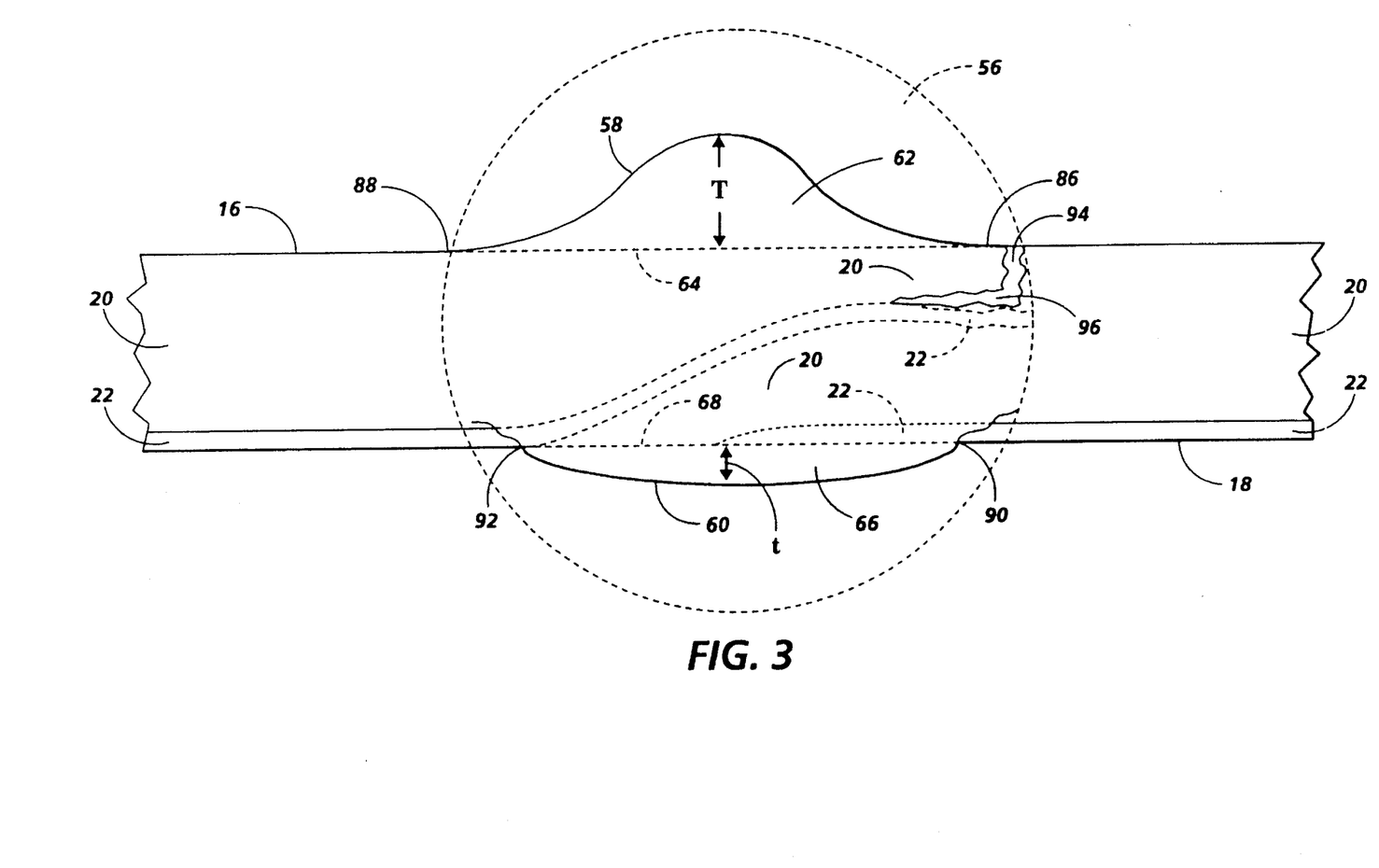
FIG. 3 is a cross-sectional view of a multiple layered seamed flexible member having an enlarged overlap region.

The ultrasonic welding apparatus 24 can join the marginal end regions 12 and 14 to form a flexible member 10 having a welded overlap region 56 in the shape illustrated in FIG. 3. Within the overlap region 56, the adjoining surfaces of the layers of PET 20 of each marginal end region 12 and 14 are integrated and the adjoining surfaces of the layers of PET 20 and ACBC 22 from opposite marginal end regions 12 and 14 are also integrated to form a continuous belt. The welded overlap region 56 has a generally substantially protruding discontinuous upper surface 58 and a generally slightly protruding discontinuous lower surface 60. The overlap region can be formed such that the thickness T of an upper portion 62 of the welded overlap region 56 above the plane 64 formed by upper surface 16 is substantially larger than the thickness t of the lower portion 66 of the welded overlap region 56 below the plane formed by the lower surface 18. The difference in the thicknesses T and t of the upper and lower portions 62 and 66, respectively, is attributable to the upward force exerted by the supporting surface of the anvil 32 during expansion of the overlap region 56 during ultrasonic welding. The upward force (of support) of the anvil 32 prevents the lower surface 60 from extending to any great extent below the plane 68. There is no similar downward force of equal magnitude on the upper surface 58 which prevents the upper surface 58 from extending above the plane 64. The weight of the ultrasonic welding apparatus 24 also exerts a downward force on the overlap region 56 as well. However, the downward force of the ultrasonic welding apparatus 24 is of lesser magnitude than the upward force of support of the anvil 32. During welding of the marginal end regions 12 and 14, the temperature of the overlap region 56 substantially increases causing the expansion thereof. Since the downward force exerted on the overlap region 56 is less than the upward force exerted thereon, the overlap region 56 expands a greater distance upward than downward. Thus, the relative difference in upward and downward expansion results in the formation of the large thickness T of the upper portion 62 relative to the small thickness t of the lower portion 66.

Figure 4:
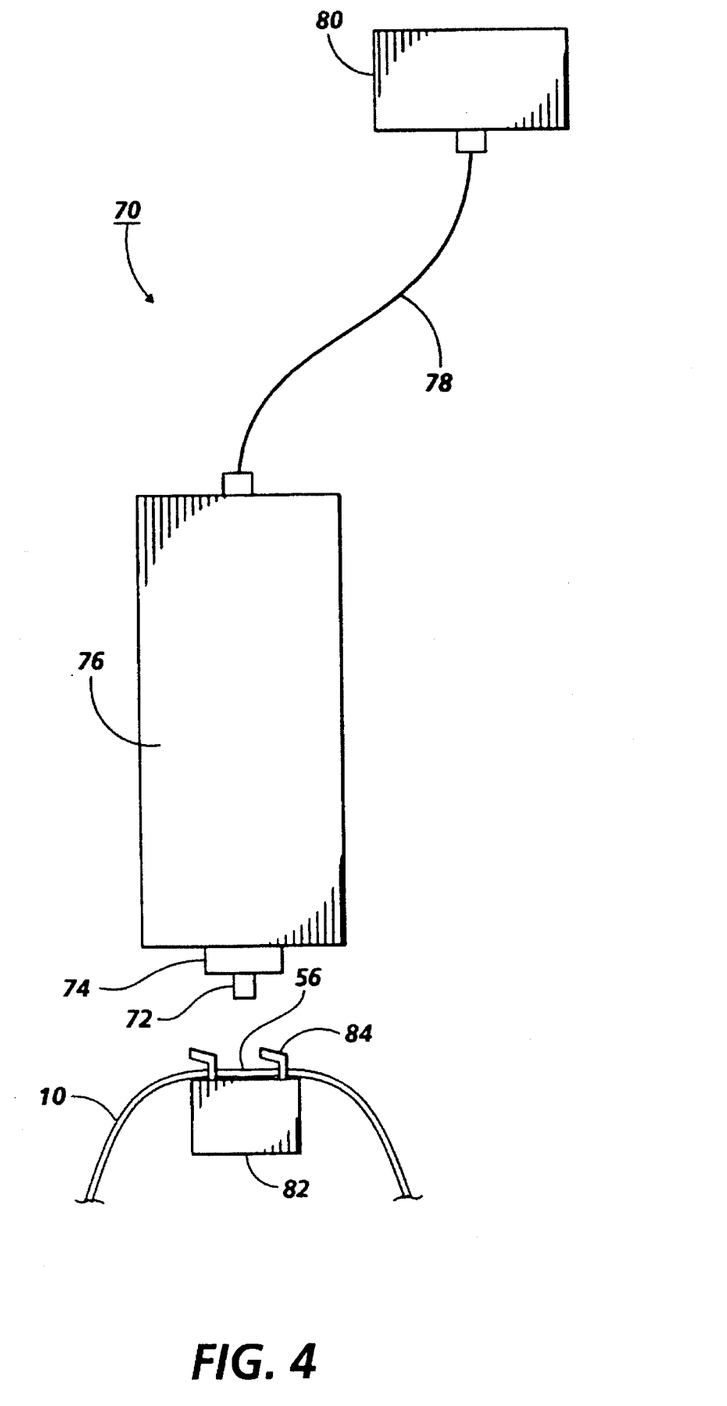
FIG. 4 is a schematic elevational view of an impulse welding apparatus.

Another desirable method in which the flexible member 10 in the form of a sheet, as illustrated in FIG. 1, can be fabricated into a continuous belt as illustrated in FIG. 3 is impulse welding. As illustrated in FIG. 4, an impulse welding apparatus 70 comprises a heating element 72, e.g., a ¼ inch wide nickel foil (0.005 inch thick), mounted on a conductive plate 74, e.g., a 1×1 inch stock of aluminum. The conductive plate 74 is positioned on the lower end of an actuator 76. The actuator 76 includes internal mechanical movable parts similar to that previously explained with respect to the transducer assembly 28 and the carriage 42 of the ultrasonic welding apparatus 24 and need not be further discussed. Electrical power is supplied to the actuator 76, and thereby to the heating element 72, via a suitable electrical connection 78 from a variac 80. The impulse welding apparatus 70 typically produces a weld force in the range of 50 to 375 pounds during a weld time of 0.25 to 2.25 seconds. A typical variac setting can range from a setting of 5 to 14 (85° C. to 1375° C.). The actuator 76 can be activated to position the heating element 72 in contact with the flexible member 10. The flexible member 10 is positioned on a support plate 82 and held in a desired and fixed position by a suitable means such as a pair of clamps 84. Alternatively, the flexible member 10 can be held by vacuum suction as previously discussed as with respect to ultrasonic welding. The heating element 72, upon placement in close proximity to or in contact with the seam of the flexible member 10, effectuates the fusing of the marginal end regions 12 and 14 together.

During machine operation, the flexible member 10 may function in various arrangements. For example, the flexible member 10 may be wrapped about a sleeve or a rigid drum and fabricated (depending on the modifications thereto) into a photoreceptor drum to function within an electrophotographic imaging apparatus. Alternatively, the flexible member 10 may be fabricated into a photoreceptor belt which cycles or bends over rollers, particularly small diameter rollers, of a belt module within an electrophotographic imaging apparatus. In the latter case, as a result of dynamic bending of the flexible member 10 during cycling, the rollers exert a force on the flexible member 10 which causes a large stress to develop generally adjacent the overlap region 56.

The stress concentrations, adjacent the overlap region 56 and induced by bending, may reach values much larger than the average value of the stress over the entire length of the flexible member 10. The induced bending stress is inversely related to the diameter of a roller that the flexible member 10 bends over and directly related to the thickness of the overlap region 56 of the flexible member 10. When a structural member, such as the flexible member 10 in the form of a belt, contains a sudden change in cross-sectional thickness such as at the upper portion 62 and to some extent at the lower portion 66, high localized stress occurs near the discontinuity. Referring again to FIG. 3, in the case of the upper portion 62, the discontinuity is at upper junction points 86 and 88 where the opposite ends of the upper surface 58 are integral with the top surface 16. In the case of the lower portion 66, the discontinuity is at the lower junction points 90 and 92 where the opposite ends of the lower surface 60 are integral with the bottom surface 18.

When the flexible member 10 bends over the rollers of a belt module within an electrophotographic imaging apparatus, the bottom surface 18 of the flexible member 10, which is adapted to contact the exterior surface of the roller, is compressed. In contrast, the top surface 16 is stretched under tension. This is attributable to the fact that the top surface 16 and the bottom surface 18 move in a circular path about the circular roller. Since the top surface 16 is at greater radial distance from the center of the circular roller than the bottom surface 18, the top surface 16 has to travel a greater distance than the bottom surface 18 in the same time period. Therefore, the top surface 16 will have to be stretched under tension relative to a generally central portion of the flexible member 10 (the portion of the flexible member 10 generally extending along the center of gravity of the flexible member 10). Likewise, the bottom surface 18 will have to be compressed relative to the generally central portion of the flexible member 10 (the portion of the flexible member 10 generally extending along the center of gravity of the flexible member 10). Consequently, the bending stresses at the junction points 86 and 88 adjacent the upper portion 62 will be tension stresses, and the bending stresses at the junction points 90 and 92 adjacent the lower portion 66 will be compression stresses.

Compression stresses, such as at the junction points 90 and 92, rarely cause seam failure. Tension stresses, such as at the junction points 86 and 88, however, are much more problematic. The tension stress concentration at the junction points 86 and 88 in great likelihood will eventually result in tear initiation through the electrically active layers of the flexible member 10 as illustrated in FIG. 3. The illustrative tear 94 is within the flexible member 10 in the portion which was once the second marginal end region 14. The generally vertically extending tear 94 initiated in the PET 20 and continued to propagate vertically therethrough. Inevitably, the tear 94 extended generally horizontally to develop seam delamination 96, which propagated through the adhesion bond between the adjoining melted surfaces of the PET 20 and the ACBC 22 (the melted ACBC 22 being shown in FIG. 3 in dotted lines). The formation of the local seam delamination 96 is typically known as seam puffing. The effect of the excess thicknesses T and t, is to cause the flexible member 10 to function during extended machine operation as if a material defect existed therein. The excessive thickness of the overlap region 56, thus tends to promote the development of dynamic fatigue seam failure and eventually leads to separation of the joined marginal end regions 12 and 14 severing the flexible member 10. Consequently, the service life of the flexible member 10 as a belt is shortened.

In addition to seam failure, the tear 94 acts as a depository site and collects toner, paper fibers, dirt, debris and other unwanted materials during electrophotographic imaging and cleaning processes of the flexible member 10. For example, during the cleaning process, a cleaning instrument such as a cleaning blade will repeatedly pass over the tear 94. As the site of the tear 80 becomes filled with debris, the cleaning instrument dislodges at least some portion of this highly concentrated level of debris from the tear 80. The amount of the debris, however, is beyond the instrument's capacity to remove. As a consequence thereof, the cleaning instrument will dislodge the highly concentrated level of debris but will not be able to remove the entire amount during the cleaning process. Instead, portions of the highly concentrated level of debris will be deposited onto the surface of the flexible member 10. In effect, the cleaning instrument will spread the debris across the surface of the flexible member 10 instead of removing the debris therefrom.

In addition to seam failure and debris spreading, if local seam delamination 96 occurs, the portion of the flexible member 10 above the seam delamination 96, in effect, becomes a flap which can move upward. The upward movement of the flap presents an additional problem in the cleaning operation. The flap becomes an obstacle in the path of the cleaning instrument as the instrument travels across the surface of the flexible member 10. The cleaning instrument eventually strikes the flap when the flap extends upward. As the cleaning instrument strikes the flap, great force is exerted on the cleaning instrument which can lead to damaging thereof, e.g., excessive wearing and tearing of a cleaning blade.

In addition to damaging the cleaning blade, the striking of the flap by the cleaning instrument causes unwanted motion in the flexible member 10. This unwanted motion adversely affects the copy/print quality produced by the flexible member 10. The copy/print quality is affected because imaging occurs on one part of the flexible member 10 simultaneously with cleaning of another part of the flexible member 10.

The motion problem with the flexible member 10 is not exclusively limited to a flexible member 10 undergoing seam delamination 96. The discontinuity in cross-sectional thickness of the flexible member 10 at the junction points 86, 88, 90 and 92 also can create unwanted motion, particularly when the flexible member 10 bends over small diameter rollers of a belt module or between two closely adjacent rollers.

The notable mechanical shortfall of the seam delamination 96 and the unwanted motion (caused by the cleaning instrument striking the flap of the seam delamination 96) in the flexible member 10 can be improved by changing the surface profile of the overlap region 56 to provide stress minimization on the flexible member 10. In particular, it is desired to reduce or eliminate the thicknesses T of the upper portion 62 and the thickness t of the lower portion 66.

Figure 5:
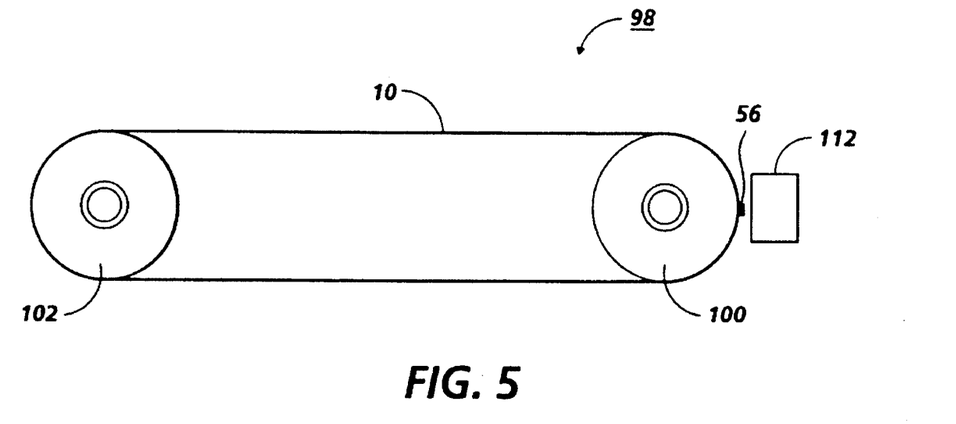
FIG. 5 is a schematic elevational view of a dual roller belt holding device and an associated finishing pad.

The profile of the overlap region 56 can be improved in a variety of ways. For example, the flexible member 10 can be retained by a dual roller belt holding device 98 in which the flexible member 10 is wrapped about a fixed roller 100 and a tensioner roller 102 as illustrated in FIG. 5. The fixed roller 100 is preferably a metallic roller coated with a thin layer of high friction material, such as rubber, etc. A metallic roller offers minimum surface deformation and the high friction surface minimizes the slippage of a flexible member 10 during grinding and finishing operations. It is desirable to place two index lines on the roller 100 surface at the outer ends to facilitate alignment of the seam with the roller 100. A middle section, disposed between the two index lines, would be adapted to contact the seam.

Figure 6:
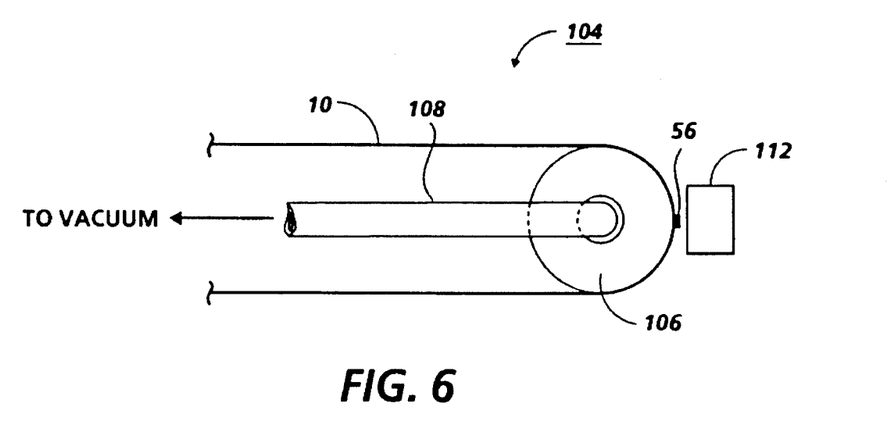
FIG. 6 is a schematic elevational view of a single roller belt holding device employing a vacuum, and an associated finishing pad.
Figure 7:
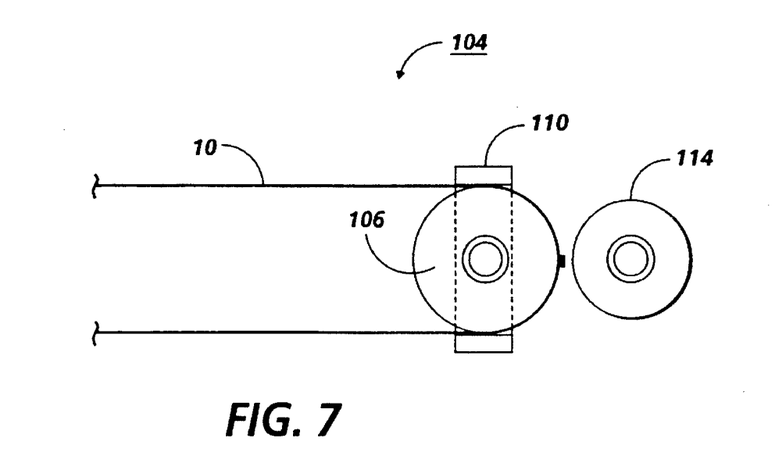
FIG. 7 is a schematic elevational view of a single roller belt holding device employing a clamp, and an associated finishing wheel.

In lieu of utilizing a dual roller belt holding device 98, a single roller belt holding device 104 can utilize a single fixed roller 106 to retain, the overlap region 56 in a desired position as illustrated in FIG. 6. As in the two roller scheme, two index lines would be placed at the outer ends of the single roller 106 surface to facilitate alignment of the seam of the flexible member 10 with the roller 106. Again, a middle section, disposed between the two index lines of the roller 106, would be adapted to contact the seam. The single fixed roller 106, however, requires the addition of a vacuum source or a clamp to maintain the flexible member 10 in a desired fixed position. If a vacuum source 108 is utilized as illustrated in FIG. 6, a section of the roller 106 surface would be perforated to include vacuum holes (not shown). The vacuum holes connected to the vacuum source 108 would urge or vacuum-pull the flexible member 10 toward the perforated surface of the single roller 106. The roller 106 surface is preferably perforated such that the vacuum holes are not positioned on the portion of the surface of the roller 106 adapted to contact the seam. Otherwise, incorrect adjustment of the profile of the overlap region 56, and damage, to the flexible member 10 may occur. If a clamp 110 is used as illustrated in FIG. 7, vacuum holes are not necessitated. Use of a clamp 110, however requires the clamp 110 to include soft inside pads to prevent damage to the surface of the flexible member 10.

The disposition of the belt holding devices 98 and 104 utilizing either the single roller scheme or the double roller scheme may vary as desired by the user. Thus, the belt holding devices 98 and 104 can be disposed in a horizontal position, a vertical position or at an angle or incline. By flexing or bending the flexible member 10 about or around a hard roller surface, such as the respective surfaces of the belt holding devices 98 and 104, the seam and the overlap region 56 can be maintained in a desirable position in which the seam and the overlap region 56 protrude outward to facilitate the finishing thereof.

After the flexible member 10 and the seam thereof are held in a desired fixed position, a variety of instruments, such as mechanical devices, can be utilized to grind or finish the overlap region 56 using adjustable positions or pressures. Such instruments can be in a fixed position and the belt holding devices 98 and 104 can be moved relative thereto. Alternatively, the belt holding devices 98 and 104 can be in a fixed position and the instruments can be moved relative thereto. The grinder or finisher instrument can be a pad or a roller with single or multiple grades of abrasive surfaces.

As illustrated in FIGS. 5 and 6, a stationary abrasive finishing pad 112 can be utilized with the dual roller holding device 98. Although, it should be understood that an abrasive finishing pad 112 can be utilized in various ways, including by itself or in combination with the previously described dual roller holding device 104. Relative movement between the finishing pad 112 and the flexible member 10 is initiated through axial movement of the finishing pad 112 past the flexible member 10. The finishing pad 112 is positioned adjacent the fixed roller at a distance which places the seam in contact with the finishing pad 112. The distance from the finishing pad 112 is less than the excessive thickness of the overlap region 56 which causes only the seam to contact the finishing pad 112 and not the remaining portion of the flexible member 10. The abrasive contact of the finishing pad 112 against the seam and the overlap region 56 effectuates the alteration of the profile thereof. The finishing pad 112 can include single or dual layers of abrasive grade surface. A modified version of the finishing pad 112 could include a heating element in addition with or as an alternative to the abrasive surface of the finishing pad 112. Such a heating element could be utilized to heat the overlap region 56 to alter the profile thereof.

Alternatively, as illustrated in FIG. 7, a finishing wheel 114 can be utilized with a single roller holding device 104. Again, it should be understood that the finishing wheel 114 can be utilized in various ways, including by itself or in combination with the previously described dual roller holding device 98. In either case, the finishing wheel 114 is movable relative to the seam of the flexible member 10 through the rotation of the finishing wheel 114. The finishing wheel 114 is positioned for contact with the seam. Thereafter, the abrasive contact of the finishing wheel 114 against the seam and the overlap region 56 effectuates the alteration of the profile thereof.

Figure 8:
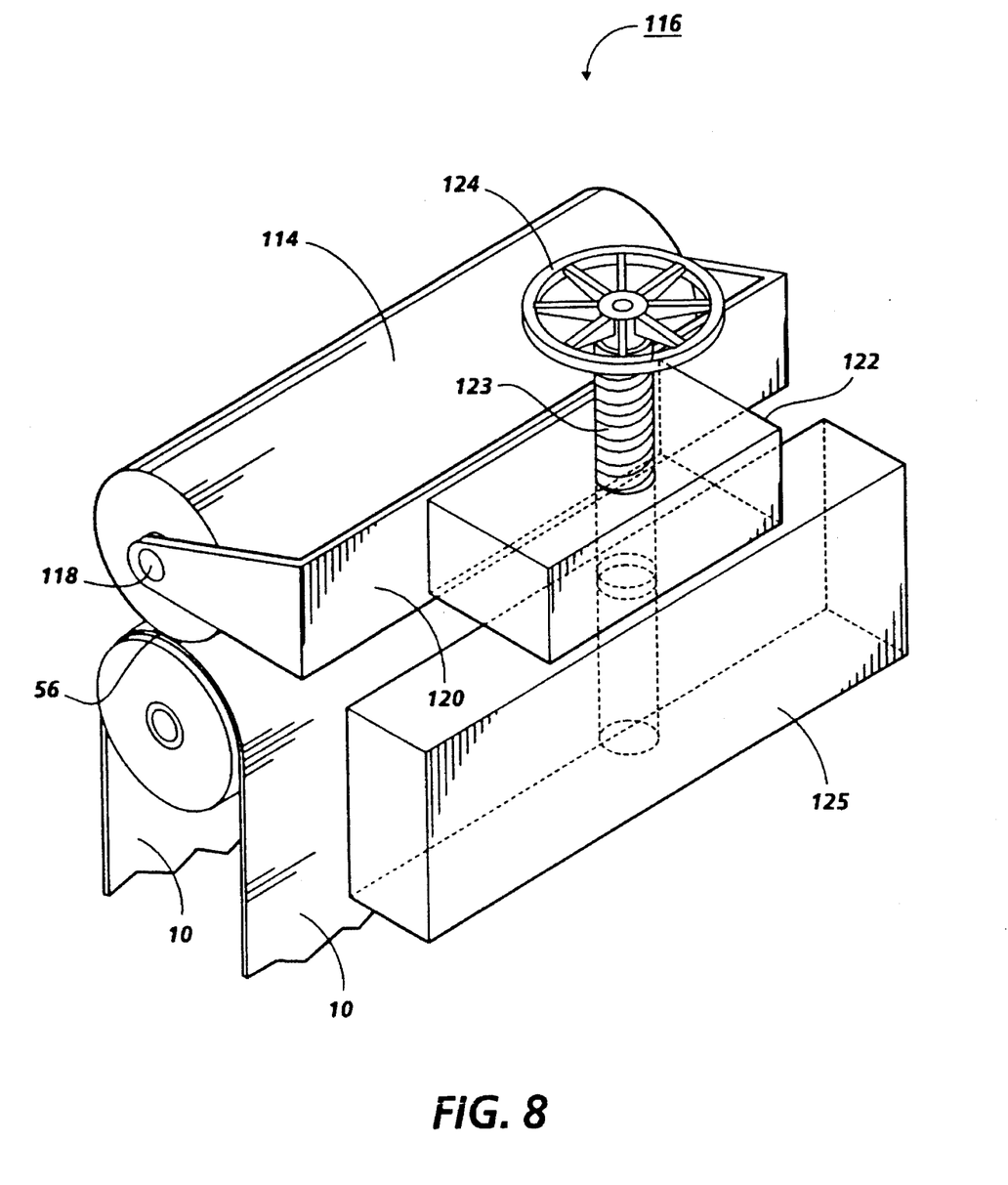
FIG. 8 is a schematic elevational view of a finishing wheel apparatus.

One example of a grinder or finisher instrument, including a finishing wheel 114, is a motor driven finishing wheel apparatus 116 shown in FIG. 8. The wheel 114 is mounted to an axle 118 for rotation therewith. The axle 118 is part of an axle frame 120 which, in turn, is attached to a carriage 122. The carriage 122 has a threaded aperture adapted to receive an upwardly extending threaded shaft 123. At an upper end of the threaded shaft 123 is a circular handle fixed thereto. The handle 124 can be manually rotated to turn the threaded shaft 123 to raise or lower the carriage 122 and, thereby, the wheel 114. The threaded shaft 123 extends upwardly from an aperture within the base 125 such that the threaded shaft 123 is freely rotatable therein and remains at a constant height. In this manner, the height of the wheel 114 can be adjusted to a desired position for optimal shape altering contact with the overlap region 56 of the flexible member 10. In order to alter the shape of the overlap region 56, the wheel 114 may include an abrasive exterior surface and/or an internal heating element to substantially raise the temperature of the exterior surface of the wheel 114.

The illustrative finishing wheel apparatus 116 is but one example of a wide variety of such devices. In lieu of using manual rotation, the threaded shaft 123 can be motor driven. In lieu of using a threaded shaft 123, a suitable gear or lever arrangement could be provided to adjust the height of the carriage 123. Thus, there exists a wide variety of modifications of the illustrative finishing wheel apparatus 116.

As in the finishing pad 112, if an abrasive exterior surface exists on the wheel 114, the abrasive surface, when adjusted for contact with the overlap region 56, is utilized to rub or wear against the seam and the overlap region 56 to alter the profile thereof. If an internal heating element is to be used, the heating element can be electrically connected to a suitable power source such as a battery or a power supply. The heating element appropriately heats the exterior surface of the wheel 114 as well as the overlap region 56 when the position of the wheel 114 is adjusted for contact therewith. The increased temperature of the wheel 114 is then used to adjust the profile of the overlap region 56.

The range of temperatures by which the overlap region 56 is heated up to depends on the thermal and rheological properties of the photosensitive layers, e.g., the glass transition temperature, of the photosensitive layers used in the flexible member 10, and are at least sufficiently high for adjusting the profile of the overlap region 56. When the layers of the flexible member 10 have reached their respective glass transition temperatures, the photosensitive layers are in a high viscosity state. The high viscosity state of the layers of the flexible member 10 readily permits material removal through flow in the overlap region 56 and shape altering by pressure thereagainst.

Thus, a finishing surface, such as that of the pad 112 or the wheel 114, can contact the material of the flexible member 10. The material of the flexible member 10, once in contact with the finishing surface, will attach thereto and be carried therewith. This is because the finishing surface, whether through abrasion or melting, will fragmentize the material allowing the fragments thereof to be picked up by the finishing surface. Typically, the temperature of the wheel 114 (or on the pad 112) ranges from 60° C. to 220° C. if utilizing a heating element. If the shape of the material in the overlap region 56 is altered by grinding, the temperature of the wheel 114 (or on the pad 112) is substantially lower then that during heating, i.e., a wheel 114 temperature of 15° C. to 60° C. This is because grinding is best performed when the ground material is cold.

Another mechanical device which could be used to adjust the overlap region 56 profile would be a skid plate which could be positioned to contact the overlap region 56. The skid plate could comprise a heating element and/or an abrasive surface which could function in a manner similar to that hereinbefore described with respect to the wheel 114.

Preferably, the abrasive surface of a desired finishing device, e.g., the pad 112, and the wheel 114, has multiple grades of abrasive surface. Such an abrasive surface should have a multiplicity of either striations, coarse grits or grainy points of abrasive contact each having a size approximately in the range of 5 to 10 microns to provide efficient polishing.

In addition to the previously described mechanical alterations of the profile, a variety of well known surface treatment methods such as chemical treatment, laser treatment, and/or further ultrasonic or impulse welding may be employed. For example, the method of laser ablation is used to improve the overlap region 56 profile through altering the shape thereof and reducing the thickness thereof. Laser ablation refers to material being ejected by the sole interaction of a high intensity laser pulse with the material. Laser ablation is usually described in terms of a physical mechanism such as vaporization, ionization, or exfoliation. Ablation is most often performed in a vacuum or air.

There are two kinds of laser ablation mechanisms: thermal and electronic (or non-thermal). If a thermal laser ablation process is used to change the overlap region 56 profile, an intense laser pulse will be utilized to very rapidly heat and melt the surface of the overlap region 56 to alter the shape thereof.

If an electronic laser ablation mechanism is used, there will be no reliance on heating to change the overlap region 56 profile. Two electronic laser ablation processes are widely known. In the first, laser photons would be used to directly excite and break the bonds of the overlap region 56 to alter the shape thereof. In the second, photo-excitation creates electron-hole pairs. Once created, the potential energy of the electron-hole pairs may be coupled directly into kinetic energy of the atoms of the overlap region 56 via a radiation-free process. The energized atoms are able to overcome the surface binding energy to alter the shape of the overlap region 56.

Electronic laser ablation is particularly preferred because (1) little or no thermal damage is observed in the area surrounding the ablated region, (2) large ablation depths per laser pulse are produced, and (3) spatial patterning and the ablated depth can be controlled precisely.

Another method of improving overlap region 56 profile is pulsed laser etching which has many of the same physical interaction mechanisms as laser ablation. Laser etching occurs in the following steps: 1) formation of reactive chemical species; 2) reaction of these species with the overlap region 56 to alter the shape thereof; and 3) removal of the excess waste from the surface of the flexible member 10.

Laser etching is a chemically assisted laser removal process that results from laser irradiation in conjunction with an external gas or liquid (or even a solid) that chemically reacts with the overlap region 56. Laser etching, however, requires an active chemical medium to be in contact with the overlap region 56 because the laser induced chemical reactions serve as the driving force for material removal. The input energy required to initiate these reactions is relatively small. Generally, it is expected that laser ablation will be chosen over laser etching because there is no need for a chemical medium. It is expected, however, that etching will be chosen over ablation whenever it is desirable to minimize the thermal loading on the overlap region 56 of the flexible member 10. In addition, etching is also considered beneficial in preventing seam distortion affecting the dimensional integrity of the flexible member 10.

Figure 9:
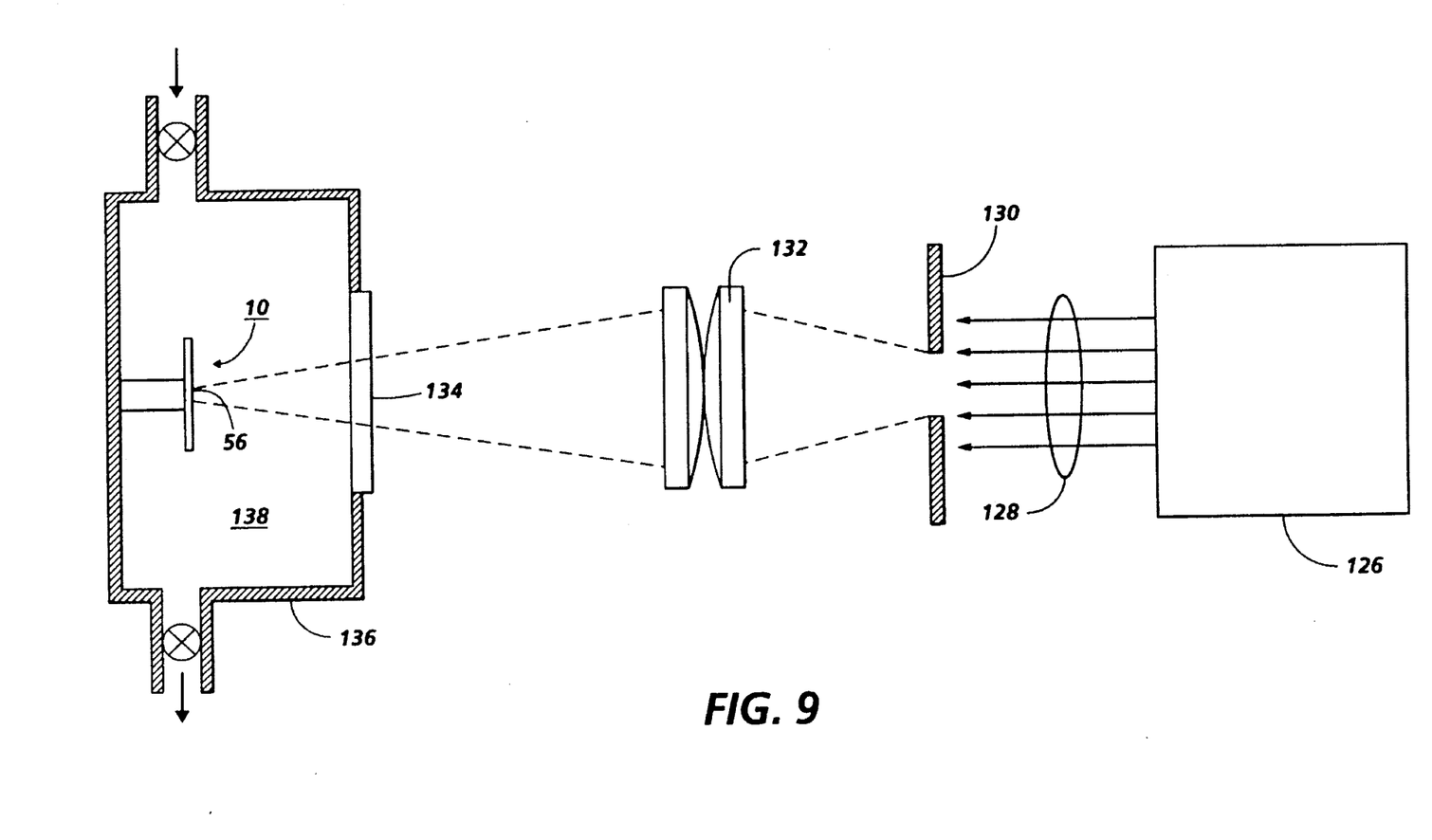
FIG. 9 is a schematic elevational view of an equipment system for performing laser ablation and etching.

An illustrative excimer laser 126 for use in either the ablation or etching process is shown in FIG. 9. The excimer laser 126 emits laser pulses 128 through an aperture or mask 130 into an imaging or focusing lens 132. The lens 132 focuses the laser pulses 128 through a window 134 (preferably formed of silica) of the cell 136 onto the flexible member 10 and against the overlap region 56. The equipment setups for performing excimer laser ablation add etching are similar. Ablation is often performed in a vacuum 138, while laser assisted etching requires the presence of an etchant or chemical medium in the cell 136. When ablation is performed in air, a cell 136 for containing a chemical medium is not required.

Another method of improving the overlap region 56 profile would be chemical treatment thereof. Such treatment would of course be affected by the material which forms the flexible member 10. For example, in flexible members having metallic layers, e.g., a metallic substrate layer, the overlap region 56 can be subjected to electrolysis, such as anodizing, in an oxidized electrolyte. Glacial acetic acid and phosphoric acid can be employed with the addition of acids having a strong oxidizing force such perchloric acid and chromic acid. Preferable examples of an electrolyte are sulfuric acid, oxalic acid and phosphoric acid because the film produced on the surface of the overlap region 56 is colorless when the above electrolytes are employed. Through chemical treatment, material in the overlap region 56 can be removed until the desired profile is obtained.

Another method of improving the overlap region 56 profile and thickness could use the previous described ultrasonic or impulse welding techniques which originally joined the marginal end regions 12 and 14 to form the overlap region 56. However, it should be understood that the use of such techniques to alter the overlap region 56 has a high level of difficulty. After all, it is the product of such techniques which necessitated the present invention of altering the profile of the overlap region 56. Therefore, it is preferable to incorporate ode or more of the previously described techniques into the welding technique.

Figure 10:
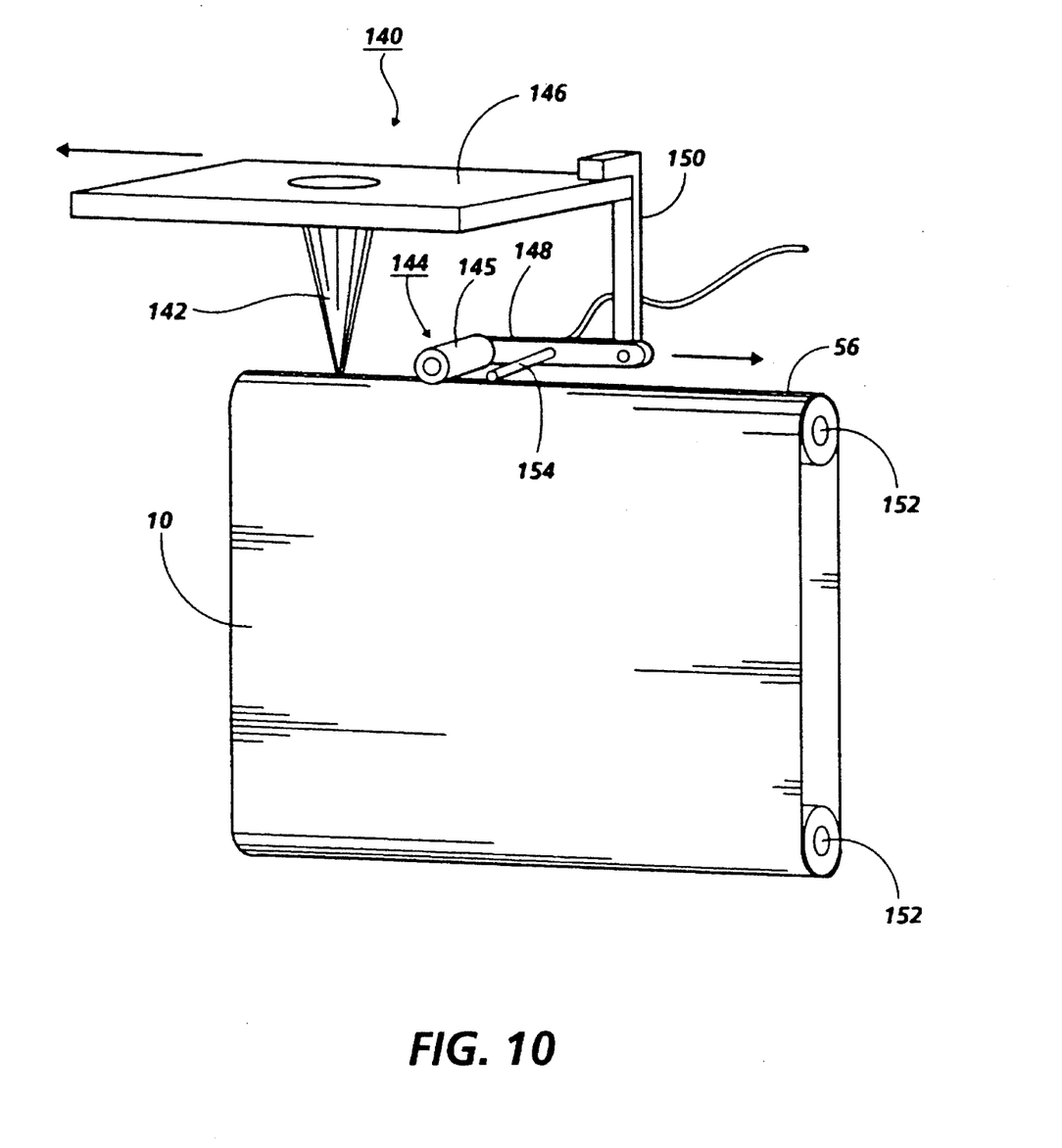
FIG. 10 is a schematic elevational view of a welding and finishing device.

For example, in FIG. 10 there is illustrated a welding and finishing device 140. The device 140 includes a welding tool 142, which can be similar to that of either the ultrasonic welding apparatus 24 or the impulse welding apparatus 70. The device 140 also includes a finishing roller 144, like in function to the finishing wheel 114. The surface 145 of the roller 144 is preferably either abrasive or temperature controlled for adjusting the profile of the overlap region 56. The finishing roller 144 can include a motor (not shown) to drive the roller 144. The welding tool 142 is mounted to a support plate 146 and the finishing roller 144 is rotatably mounted to a horizontally extending first support arm 148 which, in turn, is attached to a second support arm 150 downwardly extending from a point of attachment to the support plate 146. The support plate 146 is connected to a suitable means for moving the support plate 146 to allow the welding tool 142 and the finishing roller 144 to traverse the surface of the overlap region 56 of the flexible member 10. The distance of the finishing roller 144 from the welding tool 142 is dictated by the rate of cooling of the flexible member 10 after welding. The finishing roller 144 should be positioned at a distance allowing the temperature of the overlap region 56 to decrease to a suitable temperature dependent on the type of finishing surface.

To accomplish the traversal of the finishing device 140 across the surface of the overlap region 56, the flexible member 10 is positioned and held by clamps (not shown) on a support stage 152 in alignment for contact with both the welding tool 142 and the finishing roller 144. As the device 140 traverses along the width of the flexible member 10, against the overlap region 56, the welding tool 142 vibrates in a motion perpendicular to the surface of the overlap region 56 causing the marginal end regions 12 and 14 to weld together. The finishing roller 144 follows the welding tool 142 to alter the shape of the overlap region 56. If the finishing roller 144 includes an abrasive surface, the quality of the overlap region 56 profile can be controlled by the abrasive grade of the surface contacting the seam and the rotational speed of the roller 144. If a heating element is used, the roller 144 can be heated at the center by the heating element to increase the temperature of the roller 144 until a desired surface profile is obtained. In either case, the pressure exerted by the roller 144 on the overlap region 56 can be controlled by suitable design of the angle and length of the support arms 148 and 150.

As the finishing roller 144 alters the profile of the overlap region 56, material is removed therefrom. A small vacuum tube 154, mounted on the first support arm, is connected to a vacuum pump (not shown). The vacuum tube picks up the removed material from the overlap region 56, now in the form of debris, through suction thereof. The use of the vacuum tube is particularly desirable in combination with an abrasive surface to provide a clean seam and overlap region 56 shaping process.

The welding and finishing device 140 provides an advantageous design to form a seamed flexible member 10. By utilizing a finishing roller 144 in combination with a welding tool 142, the formation of a smooth seam can be more readily obtained. Ultrasonic welding techniques generally compact enormous energy during a short time, thereby, producing a rough seam. Such rough seams have an uneven surface due to the presence of surface protrusions ("burrs") thereon. By combining a finishing device, such as the roller 144, with a seam forming device, such as the welding tool 142, the surface protrusions ("burrs") can be substantially eliminated by the finishing roller 144. The time efficiency of the welding and finishing device 140 can be readily appreciated since the welding and the finishing steps occur generally simultaneously (one portion of the flexible member 10 being welded while another previously welded portion thereof is finished).

Using a suitable technique to alter the profile of the overlap region 56, including the previously described techniques, the thickness of the overlap region 56 can be reduced. Preferably, the reduction of the thickness of the overlap region 56 results in the elimination of the thickness T of the upper portion 62. It should be understood that altering the shape of the overlap region 56 to eliminate the upper portion 62 provides the greatest benefit in reducing stress concentration on the flexible member 10 since the upper portion 62 is under tension stress. Tension stress, as previously explained, eventually results in tear initiation 94 and seam delamination 96 through the flexible member 10. The reduction or substantial elimination of the thickness T of the upper portion 62, reduces high localized stress at the discontinuity in cross-sectional thickness of the flexible member 10 at the upper junction points 86 and 88 and leads to longer service life of the flexible member 10. In contrast, the lower portion 66 is under compression stress which, as previously explained, is unlikely to result in tear initiation 94 through the flexible member 10. The reduction or substantial elimination of the thickness t of the lower portion 66, does however reduce localized stress at the discontinuity in cross-sectional thickness of the flexible member 10 at the lower junction points 90 and 92 and is presented as a viable option.

Figure 11:
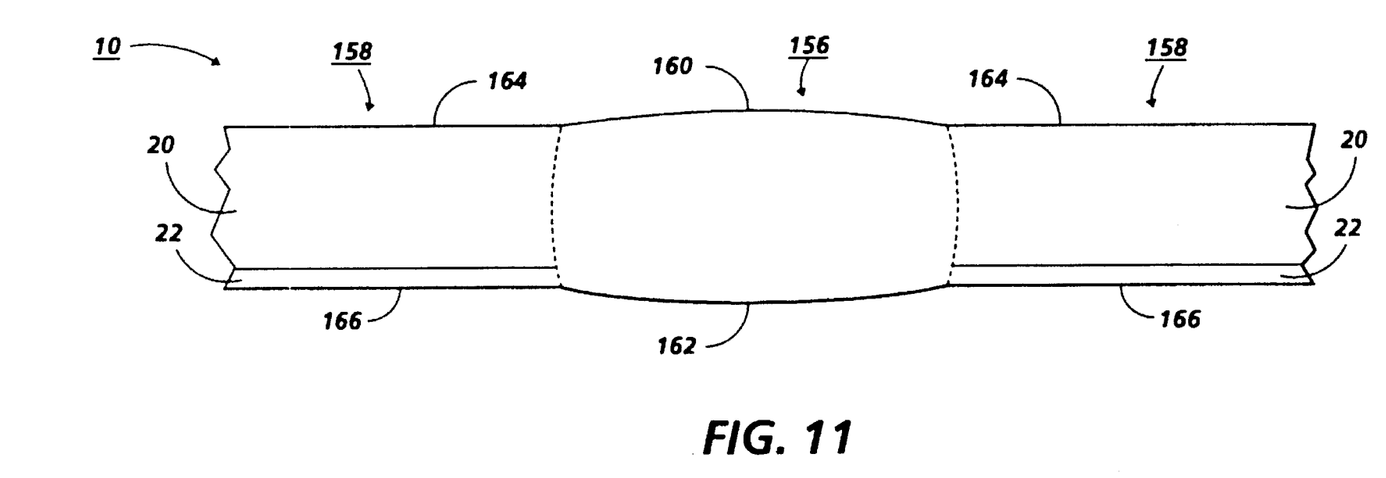
FIG. 11 is a schematic elevational view of one embodiment of a shaped altered flexible member in accordance with the present invention.

One such flexible member 10 shaped altered according to the methods of the present invention is illustrated in FIG. 11. The flexible member 10 has a shape altered overlap region 156 and a non-overlap region 158. The shaped altered overlap region 156 has a cross-sectional thickness generally equal to the cross-sectional thickness of the non-overlap region 158. The discontinuity in cross-sectional thickness of the flexible member 10 at the overlap region 56 illustrated in FIG. 3 is substantially eliminated in the flexible member 10 illustrated in FIG. 11.

The substantially protruding upper surface 58 has been transformed to a generally flattened but very slightly protruding surface 160. Likewise, the generally slightly protruding lower surface 60 has been transformed to a similarly generally flattened but very slightly protruding surface 162. Acceptable protruding height of the thicknesses T and t of the overlap region 156 respectively above the plane formed by surface 164 and below the plane formed by surface 166 is less than 20% of the thickness of the flexible member 10 between the surfaces 164 and 166, or in other words, the thickness of the non-overlap region 158. Preferably, the protruding heights of the respective thicknesses T and t are less than 10% of the thickness of the non-overlap region 158 of the flexible member 10. The non-overlap region 158 has a first exterior surface, e.g. a top surface 164, and a second exterior surface, e.g. a bottom surface 166 which are the unaltered portions of the surfaces 16 and 18 of the flexible member 10 in FIG. 1.

The newly formed surfaces 160 and 162 are generally aligned in the same plane with the surfaces 164 and 166, respectively, when the flexible member 10 is flattened or positioned to lie in a straight plane. When the flexible member 10 is folded or bent the surfaces 160 and 162 are not in the same plane only because of the folding and not because of any surface or cross-sectional thickness discontinuity. The surfaces 160 and 162 are co-planar and are defined as being "flush" with surfaces 164 and 166 because but for the folding of the flexible member 10, the surfaces 160 and 162 would lie in the same plane as the surfaces 164 and 166, respectively, since there is no surface discontinuity between the surfaces 160 and 162 and the surfaces 164 and 166. It should be apparent that the surfaces 160 and 162 lie in the same plane as the surfaces 164 and 166, respectively, when the flexible member 10 is flattened or positioned to lie in a straight plane.

Figure 12:
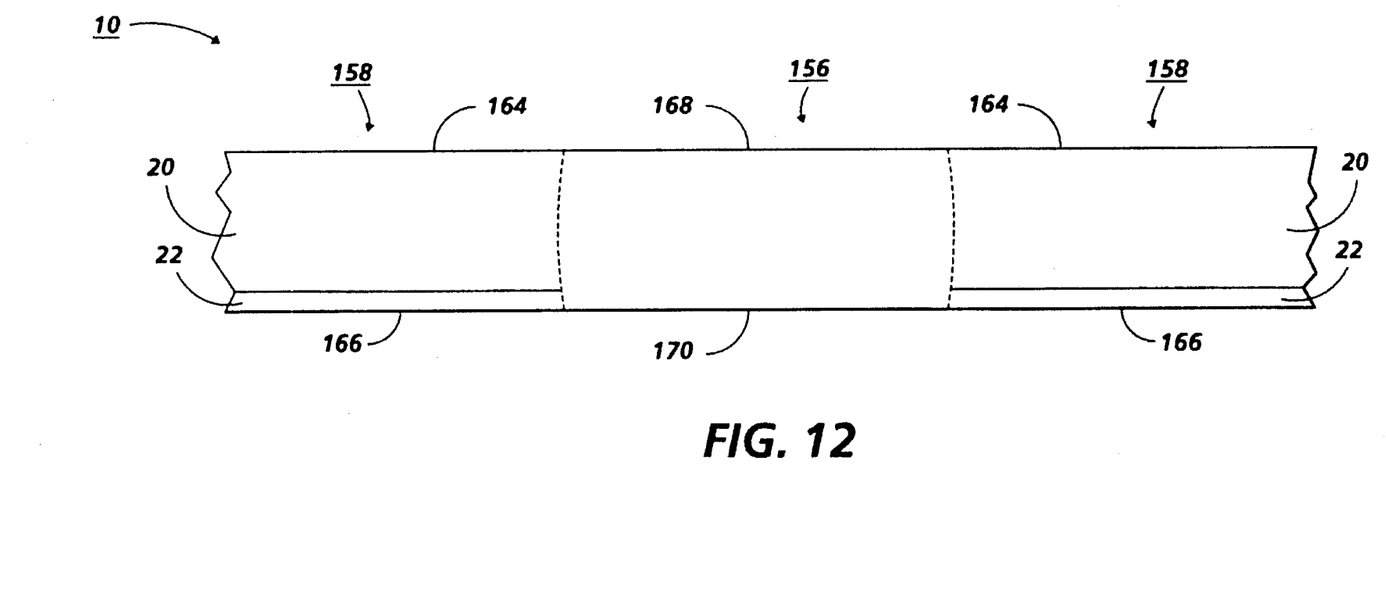
FIG. 12 is a schematic elevational view of another embodiment of a shaped altered flexible member in accordance with the present invention.

Any of the previously described techniques can be utilized to transform the shape of the overlap region 56 into the shape of the overlap region 156 and to form the generally flattened but very slightly protruding surfaces 160 and 162. However, to provide even greater reduction in stress on the flexible member 10, it is preferable to completely eliminate any cross-sectional thickness discontinuity of the flexible member 10. One example of such a flexible member 10 is illustrated in FIG. 12. The illustrative flexible member 10 of FIG. 12 is formed by a suitable technique using an abrasive surface such as the pad 112, the wheel 114, or the roller 144. The flexible member 10 of FIG. 12 has a first planar surface 168, e.g., a top surface, and a second planar surface 170, e.g., a bottom surface. An abrasive surface is particularly suited for transforming the generally substantially protruding upper surface 58 of FIG. 3 to the planar surface 168 of FIG. 12 and the generally slightly protruding lower surface 60 of FIG. 3 to the planar surface 170 of FIG. 12. The abrasive surface can be rubbed against the upper portion 62 and the lower portion 66 until the thickness of the overlap region 56 is reduced such that the thicknesses T and t are substantially eliminated. In this manner, the discontinuity of the cross-sectional thickness between the overlap region 156 and the non-overlap region 158 is substantially eliminated. As a consequence, the overlap region 156 and the non-overlap region 158 have equal cross-sectional thicknesses. Since there is almost no change in cross-sectional thickness, the stress concentration at a particular point or points, such as at the upper junction points 86 and 88 of the flexible member 10 as illustrated in FIG. 3, is minimized or substantially eliminated in the flexible member 10 of FIG. 12. In the flexible member 10 of FIG. 12, the stress is evenly distributed across the entire portion thereof. The reduction in stress, in turn, reduces the rate of seam failure and prolongs the mechanical service life of the flexible member 10.

In effect, the flexible member 10 of FIG. 12 has near undetectable seam defects because the adjoining surfaces of the overlap region 156 and the non-overlap region 158 are co-planar, in other words, flush with one another. It should now be apparent that the surfaces 168 and 170 lie in the same plane as the surfaces 164 and 166, respectively, when the flexible member 10 is flattened or positioned to lie in a straight plane.

In recapitulation, it is evident that the method of constructing a flexible imaging sheet produces a flexible member not only without any cross-sectional thickness or surface discontinuity but generally undetectable seam defects as well. The flexible member of the present invention comprises an overlap region formed by opposite marginal end regions of the flexible imaging sheet. The surfaces of the first marginal end region and the second end marginal are co-planar and lie flush with one another because there is neither surface discontinuity nor cross-sectional thickness discontinuity within the overlap region. The adjoining surfaces of the first marginal end region and the second marginal end region are co-planar with one another, and form a generally planar surface which minimizes stress concentration on the flexible imaging sheet.

It is, therefore, apparent that there has been provided in accordance with the present invention, a flexible member and a method of constructing a flexible imaging sheet that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method of constructing a seamed, flexible imaging sheet for use in an electrophotographic imaging apparatus, comprising the steps of;

overlapping a first marginal end region and a second marginal end region of the flexible imaging sheet to form an overlap region and a non-overlap region;

joining the first marginal end region and the second marginal end region to one another in the overlap region;

shaping the overlap region to form a generally planar surface substantially co-planar with a surface of the non-overlap region to minimize stress concentration on the sheet, resulting in a seamed, endless, flexible member; and forming a layer on the flexible imaging sheet subsequent to said steps of joining and shaping.

* * * * *